United States Patent
Lesso

(10) Patent No.: US 11,721,346 B2
(45) Date of Patent: Aug. 8, 2023

(54) AUTHENTICATION DEVICE

(71) Applicant: Cirrus Logic International Semiconductor Ltd., Edinburgh (GB)

(72) Inventor: John P. Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 325 days.

(21) Appl. No.: 16/897,815

(22) Filed: Jun. 10, 2020

(65) Prior Publication Data

US 2021/0390960 A1 Dec. 16, 2021

(51) Int. Cl.
*G10L 17/22* (2013.01)
*H04L 9/06* (2006.01)
*H04L 9/32* (2006.01)

(52) U.S. Cl.
CPC .......... *G10L 17/22* (2013.01); *H04L 9/0643* (2013.01); *H04L 9/3268* (2013.01)

(58) Field of Classification Search
CPC ......... G10L 17/22; G10L 17/26; G10L 25/51; G06F 21/32; G06F 2221/2133; H04L 9/0643; H04L 9/3268; H04L 9/32; H04L 63/0428; H04L 63/0861; H04L 63/0823; H04L 63/123
See application file for complete search history.

(56) References Cited

U.S. PATENT DOCUMENTS

| 11,011,178 | B2* | 5/2021 | Bhimanaik | G10L 25/51 |
| 2018/0130475 | A1* | 5/2018 | Page | G10L 25/84 |
| 2019/0214022 | A1* | 7/2019 | Vaquero | G10L 17/04 |
| 2020/0035247 | A1* | 1/2020 | Boyadjiev | G10L 17/22 |

FOREIGN PATENT DOCUMENTS

| EP | 3599606 A1 | 1/2020 |
| GB | 2561928 A | 10/2018 |
| WO | 2017212235 A1 | 12/2017 |
| WO | 2019145708 A1 | 8/2019 |

OTHER PUBLICATIONS

Partial International Search Report and Provisional Opinion of the International Searching Authority, International Application No. PCT/GB2021/050779, dated Jun. 24, 2021.

* cited by examiner

*Primary Examiner* — Han Yang
(74) *Attorney, Agent, or Firm* — Jackson Walker L.L.P.

(57) ABSTRACT

A method of authenticating a speech signal in a first device comprises receiving a speech signal, and performing a live speech detection process to determine whether the received signal represents live speech. The live speech detection process generates a live speech detection output. A certificate is formed by encrypting at least the live speech detection output. The received signal, and the certificate, are transmitted to a separate second device.

11 Claims, 5 Drawing Sheets

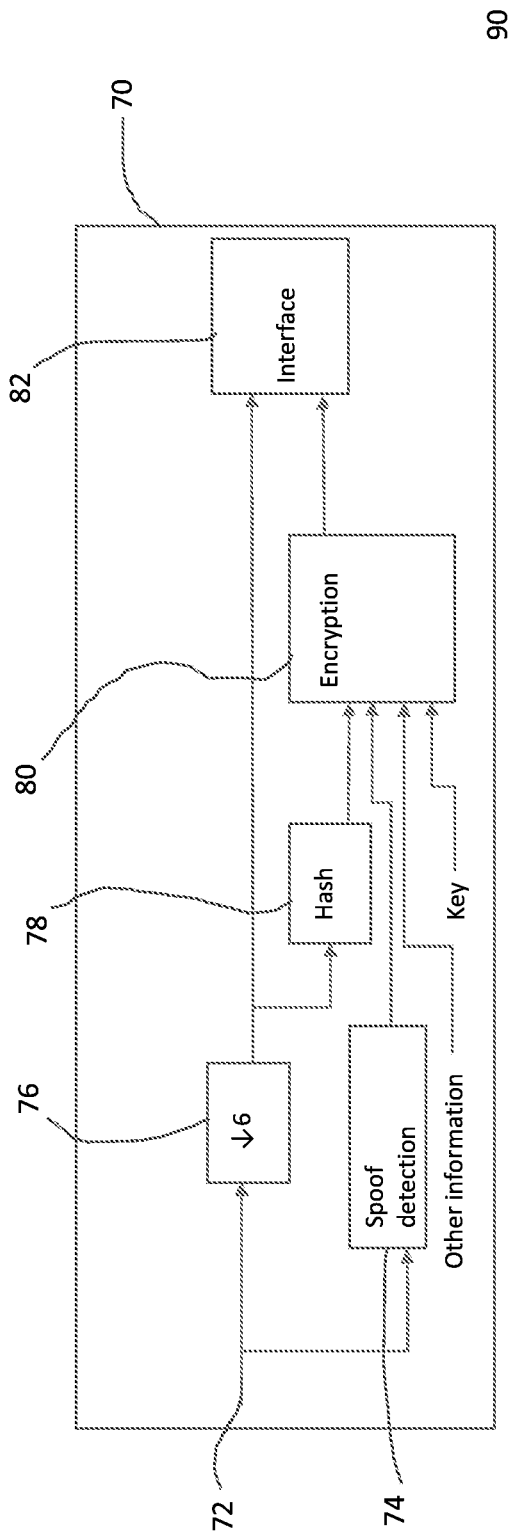
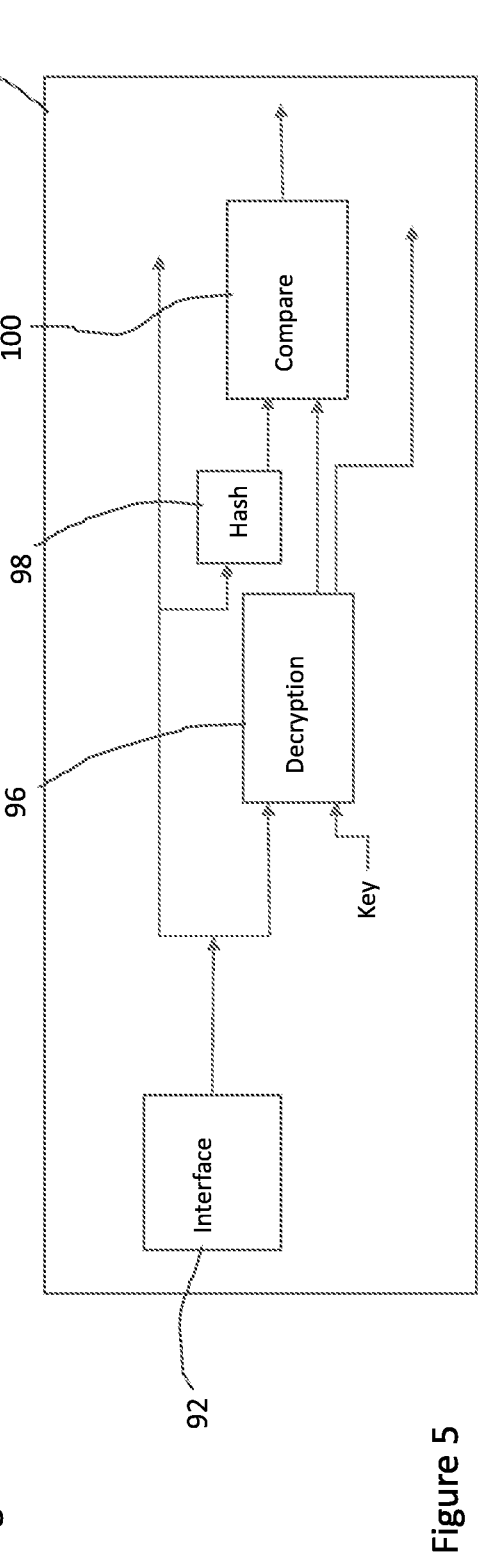
Figure 4
Figure 5

AUTHENTICATION DEVICE

TECHNICAL FIELD

Embodiments described herein relate to methods and devices for authenticating a received speech signal.

BACKGROUND

Speech recognition systems are known, allowing a user to control a device or system using spoken commands. It is common to use speaker recognition systems in conjunction with speech recognition systems. A speaker recognition system can be used to verify the identity of a person who is speaking, and this can be used to control the operation of the speech recognition system.

As an illustration of this, a spoken command may relate to the personal tastes of the speaker. For example, the spoken command may be "Play my favourite music", in which case it is necessary to know the identity of the speaker before it is possible to determine which music should be played.

As another illustration, a spoken command may relate to a financial transaction. For example, the spoken command may be an instruction that involves transferring money to a specific recipient. In that case, before acting on the spoken command, it is necessary to have a high degree of confidence that the command was spoken by the presumed speaker.

One issue with systems that use speech recognition is that they can be activated by speech that was not intended as a command. For example, speech from a TV in a room might be detected by a smart speaker device, and might cause the smart speaker device to act on that speech, even though the owner of the device did not intend that.

Speaker recognition systems often use a voice biometric, where the received speech is compared with a model generated when a person enrolls with the system. This attempts to ensure that a device only acts on a spoken command if it was in fact spoken by the enrolled user of the device.

One issue with this system is that it can be attacked by using a recording of the speech of the enrolled speaker, in a replay attack.

Methods exist for detecting when received speech is live speech, and distinguishing live speech from recorded speech.

SUMMARY

According to a first aspect of the invention, there is provided a method of authenticating a speech signal in a first device, the method comprising: receiving a speech signal; performing a live speech detection process to determine whether the received signal represents live speech, wherein the live speech detection process generates a live speech detection output; forming a certificate by encrypting at least the live speech detection output; and transmitting the received signal and the certificate to a separate second device.

According to a second aspect of the invention, there is provided a device comprising: an input for receiving a speech signal; a processor for performing a live speech detection process to determine whether the received signal represents live speech, wherein the live speech detection process generates a live speech detection output; and for forming a certificate by encrypting at least the live speech detection output; and an output configured for transmitting the received signal and the certificate to a separate second device.

According to a third aspect of the invention, there is provided a computer program product, comprising machine readable code containing instructions for causing an audio processing circuit to perform a method according to the first aspect.

BRIEF DESCRIPTION OF DRAWINGS

For a better understanding of the present invention, and to show how it may be put into effect, reference will now be made to the accompanying drawings, in which:—

FIG. 4 illustrates in more detail a part of a first device as shown in FIGS. 1 and 2;

FIG. 5 illustrates in more detail a part of a second device as shown in FIGS. 1 and 2.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
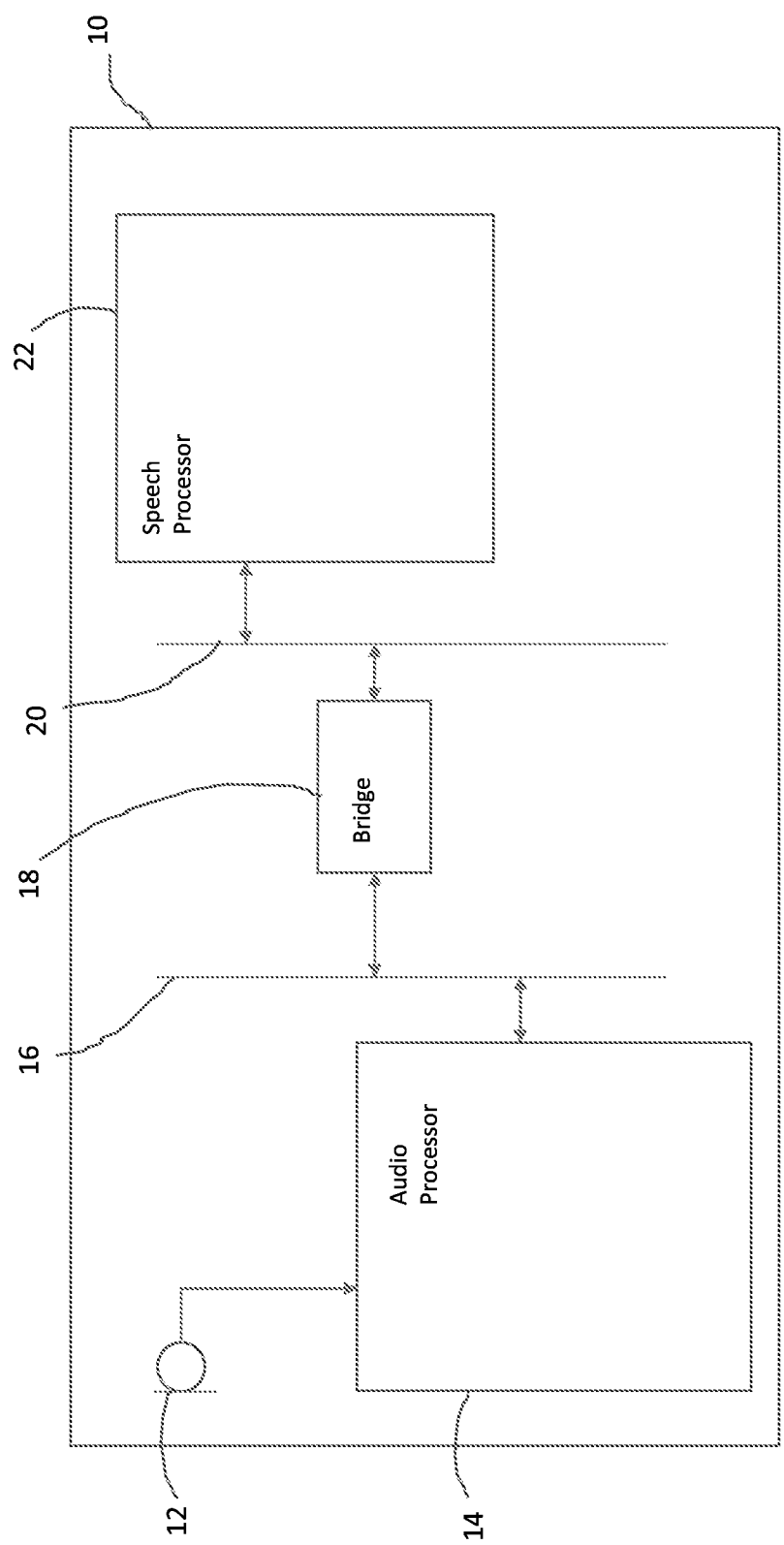
FIG. 1 illustrates an example of an electronic device.

FIG. 1 illustrates an electronic device 10. The electronic device 10 may for example be a laptop or tablet computer, a smartphone, a games controller, a smart speaker device, a home automation controller, a camera, or the like.

The electronic device 10 includes at least one microphone 12, for detecting sounds in the vicinity of the device.

Signals generated by the microphone 12 are passed to a first integrated circuit, in the form of a first processing device 14, which is referred to herein as an audio processor as the device is configured in particular for performing certain processing steps on received audio signals. However, the first processing device 14 may take the form of a suitably programmed general digital signal processor or other processor.

The audio processor 14 is connected to a first bus 16. The first bus 16 is connected by a bridge circuit 18 to a second bus 20.

The electronic device 10 includes a second integrated circuit, in the form of a second processing device 22, which is connected to the second bus 20. The second processing device 22 is referred to herein as a speech processor as the function that is of most relevance for the understanding of the present disclosure is a speech processing function. However, the second processing device 22 may be configured for performing any desired processing steps on received signals. For example, in the case where the device 10 is a smartphone, the second processing device 22 may be the applications processor of the device.

It will be appreciated that the device 10 of FIG. 1 is shown by way of example only, and the methods described herein may be of use in any electronic device that includes separate processing circuits. It will also be appreciated that the device 10 of FIG. 1 includes many components that are not shown in FIG. 1, but such components are not essential for practising the methods described herein.

Figure 2:
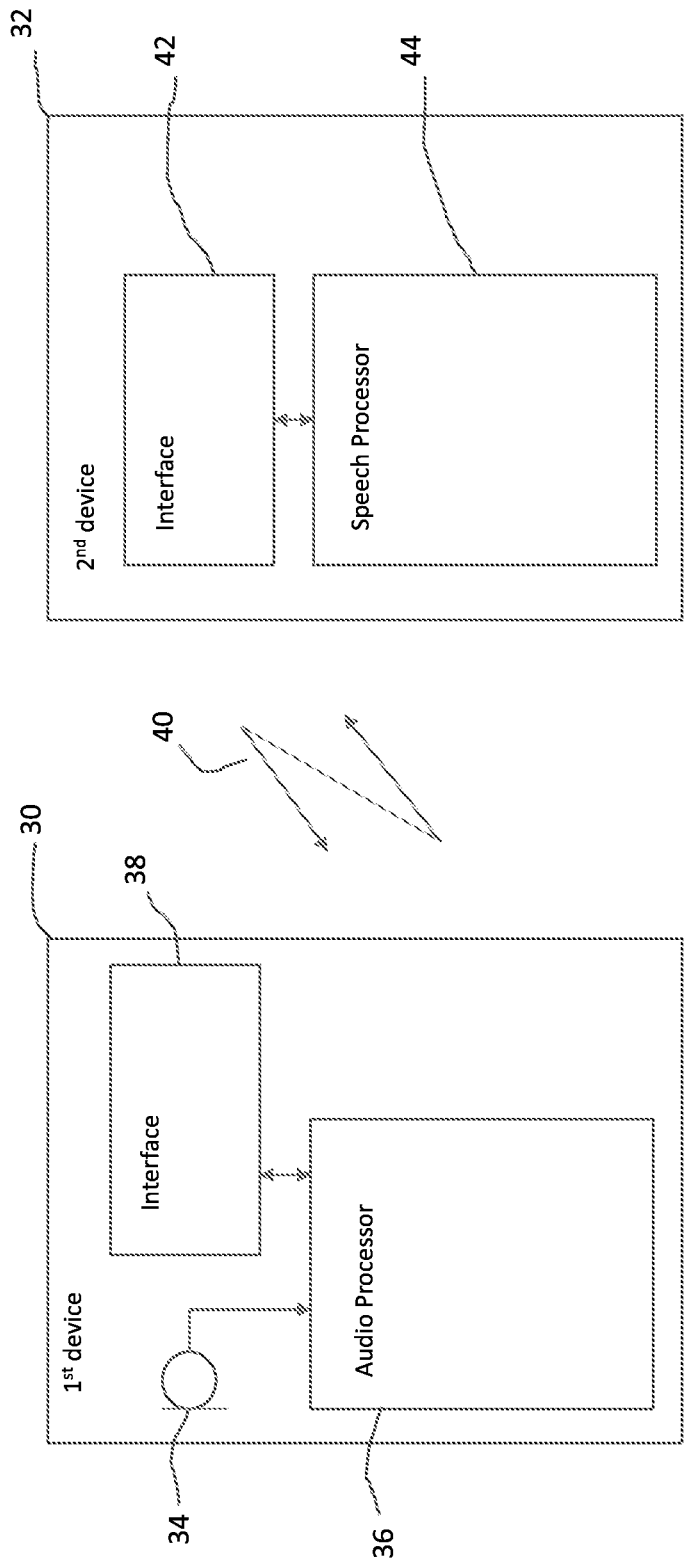
FIG. 2 is a schematic diagram, illustrating the form of first and second electronic devices.

FIG. 2 illustrates a system including a first electronic device 30 and a second electronic device 32.

The first electronic device 30 may for example be a laptop or tablet computer, a smartphone, a games controller, a smart speaker device, a home automation controller, or the like.

The electronic device 30 includes at least one microphone 34, for detecting sounds in the vicinity of the device.

Signals generated by the microphone 34 are passed to a first processing device 36, which is referred to herein as an audio processor as the device is configured in particular for performing certain processing steps on received audio signals. However, the first processing device 36 may take the form of a suitably programmed general digital signal processor or other processor.

The first electronic device 30 also includes an interface circuit 38 for converting signals received from the audio processor 36 into a format suitable for transmitting over a communications link 40 to the second electronic device 32. For example, where the communications link is a wireless link, the interface circuit 38 is configured to put the signals into the format required by the relevant wireless communications standard.

The second electronic device 32 also includes an interface circuit 42 for converting signals received over the communications link 40. The interface circuit 42 is connected to a second processing device 44. The second processing device 44 is referred to herein as a speech processor as the function that is of most relevance for the understanding of the present disclosure is a speech processing function. However, the second processing device 44 may be configured for performing any desired processing steps on received signals.

When the first electronic device 30 is a device such as a laptop or tablet computer, a smartphone, a games controller, a smart speaker device, or a home automation controller, the second electronic device 32 may for example take the form of a cloud computing device that is configured for performing speech recognition on signals that it receives from multiple electronic devices.

In other embodiments, the second electronic device 32 may for example be a device such as a laptop or tablet computer, a smartphone, a games controller, a smart speaker device, or a home automation controller, and the first electronic device 30 may be an accessory of the second electronic device 32. For example, the first electronic device 30 may in that case take the form of a headset having a short range wireless connection to the second electronic device 32.

It will be appreciated that the system comprising the devices 30, 32 of FIG. 2 is shown by way of example only, and the methods described herein may be of use in any pair of electronic devices. It will also be appreciated that the devices 30, 32 of FIG. 2 includes many components that are not shown in FIG. 2, but such components are not essential for practising the methods described herein.

Figure 3:
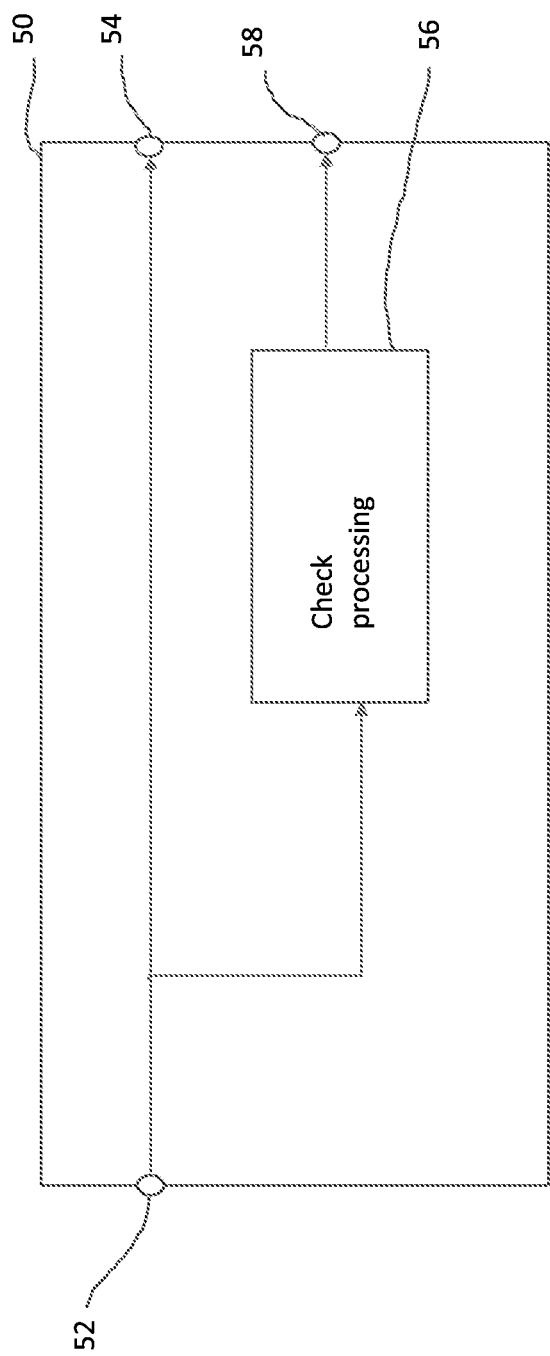
FIG. 3 illustrates a part of the devices of FIGS. 1 and 2.

FIG. 3 is a schematic illustration of a device 50 in accordance with one embodiment. The device 50 may for example be the audio processor 14 shown in FIG. 1, the audio processor 36 shown in FIG. 2, or the first device 30 shown in FIG. 2.

The device 50 has an input 52, on which it receives an input audio signal. The received audio signal is supplied on a first output terminal 54 of the device 50. The device 50 may or may not perform any processing on the received audio signal in the path between the input terminal 52 and the output terminal 54.

The device 50 also includes a check processing block 56, which also receives the input audio signal, and generates an output signal that is passed to a second output terminal 58.

The check processing block 56 is configured to receive the input audio signal, and to perform a liveness detection process, also referred to as an antispoofing process, on the received signal.

The liveness detection process, or antispoofing process, may for example involve examining different frequency components of the received audio signal, because it is known that many recorded sounds are recorded or played back through devices with frequency responses that do not cover the whole of the audio spectrum. Alternatively, or additionally, the liveness detection process may for example involve examining ultrasound components of the received audio signal, because it is known that many recorded sounds are recorded or played back through devices with frequency responses that do not cover ultrasounds frequencies.

In some embodiments, the check processing block 56 is configured for generating the output signal based on the result of the liveness detection process, such that the output signal may take one of at least three values, namely: a first value, indicating that the received audio signal has a high probability of representing live speech, a second value, indicating that the received audio signal has a low probability of representing live speech, and a third value, indicating that the received audio signal has an intermediate probability of representing live speech.

Thus, the device may output a positive signal, indicating that the received audio signal has a high probability of representing live speech, a negative signal, indicating that the received audio signal has a low probability of representing live speech, and an intermediate signal, indicating that the device does not have a high confidence as to whether or not the received audio signal represents live speech.

In addition, the check processing block 56 may be configured for performing a speaker change detection process on the received audio signal. That is, the check processing block 56 identifies times during the received audio signal when the person speaking is determined to have changed. The speaker change detection process may involve monitoring some feature of the received audio signal, in order to determine when the speaker has changed. For example, the speaker change detection process may involve monitoring a fundamental frequency of the received speech, in order to detect sudden changes that may indicate a change of speaker. As another example, in a device that receives signals from two or more microphones, a sudden change in the direction from which the sound is received may be indicative of a change of speaker. As another example, the speaker change detection process may involve extracting features of the received speech that are potentially useful in speaker recognition, such that a sudden change in the extracted features may be indicative of a speaker change.

As illustrated here, the signal representing the result of performing the liveness detection on the received audio signal may be sent to a separate device, in which for example speech recognition may be performed on the received signal. However, this leads to the problem that the link between the two devices may not be secure. If a false positive signal is sent on the link between the two devices, the device that performs the speech recognition may be caused to act on recorded speech, and hence be vulnerable to a replay attack. If a false negative signal is sent on the link between the two devices, the device that performs the speech recognition may be rendered unusable, because it will always treat the received speech as unreliable.

Therefore, in some embodiments, the device is configured for allowing its output signal to be authenticated by the second device that receives the signal.

FIG. 4 is a block diagram, showing in more detail the features of the first device that are relevant for the purposes of performing the liveness detection, and for generating the relevant authentication signal.

As shown in FIG. 4, the first device 70 has an input 72, for receiving an input audio signal. The input 72 may be an input of the device 70, or may be an input from a microphone provided on the device 70. The input 72 may receive all of a signal that is generated by a microphone, or may receive the microphone signal after some initial processing. For example, the microphone signal may be passed to an activity detection block (not shown in FIG. 4), so that only signals with some audio content, or only signals with some detected speech content, are supplied on the input 72.

The signal on the input 72 is passed to a spoof detection block 74, which performs a test to determine whether the signal represents live speech. The received signal may be divided into segments, with the test being performed on each segment, and with the result of each test being sent separately to the second device. Alternatively, a single test may be performed on the whole of an input signal representing one utterance by a person speaking.

As described with reference to FIG. 3, the liveness detection process, or antispoofing process, may for example involve examining different frequency components of the received audio signal, because it is known that many recorded sounds are recorded or played back through devices with frequency responses that do not cover the whole of the audio spectrum. One example of such a liveness detection process is disclosed in WO2020/025951, in which the frequency spectrum of a portion of an audio signal representing speech is compared with an expected frequency spectrum, where the expected frequency spectrum may be based on the speech content of the audio signal. Alternatively, or additionally, the liveness detection process may for example involve examining ultrasound components of the received audio signal, because it is known that many recorded sounds are recorded or played back through devices with frequency responses that do not cover ultrasounds frequencies.

In this example, the liveness detection process performed by the spoof detection block 74 involves examining ultrasound components of the received audio signal. As a result, while it is generally sufficient for an audio signal to have a sampling rate of 16 kHz, it is advantageous for the received audio signal to have a higher sampling rate, so that the ultrasound components can be accurately represented. Specifically, in this example, the received audio signal has a sampling rate of 96 kHz, although the received audio signal may have any suitable sampling rate, for example 192 kHz.

The liveness detection process performed by the spoof detection block 74 takes account of various properties of the received audio signal, before performing the main liveness detection process. For example, the main liveness detection process may be unable to generate a reliable indication in cases where the signal-to-noise ratio (SNR) of the received audio signal is too low. As another example, the main liveness detection process may be unable to generate a reliable indication in cases where the noise floor of the received signal is too high. As a further example, the main liveness detection process may be unable to generate a reliable indication in situations where narrow-band interferers are causing too many tones in a frequency region of interest. Similarly, the main liveness detection process may be unable to generate a reliable indication in cases where the fundamental frequency (FO) of the speech in the received audio signal is too high.

Thus, quality metrics relating these properties of the received audio signal may be calculated initially.

Thus, the liveness detection process performed by the spoof detection block 74 may produce one of three possible outputs, namely: a first output value, indicating that the received audio signal has a high probability of representing live speech, a second output value, indicating that the received audio signal has a low probability of representing live speech, and a third output value, indicating that the received audio signal has an intermediate probability of representing live speech. The third output value may be generated in all cases where the calculated quality metrics indicate that the liveness detection process will be unable to generate a reliable indication of the probability that the audio signal represents live speech. The third output value may also be generated in cases where the liveness detection process produces an intermediate result, for example in a region close to a threshold value, meaning that the test cannot with confidence indicate whether the received audio signal does or does not represent live speech.

As mentioned above, in this example, the received audio signal has a sampling rate of 96 kHz, while it is generally sufficient for most audio processing purposes such as speech recognition for an audio signal to have a sampling rate of 16 kHz. The received audio signal with the sampling rate of 96 kHz is therefore also passed to a downsampler 76, where its sampling rate is reduced to 16 kHz. In other examples the received audio signal may have any convenient sampling rate, typically but not necessarily higher than 16 kHz, such as 192 kHz, so that it can be downconverted to 16 kHz. It is this downsampled signal that is transmitted to the second device.

In addition, the downsampled signal is passed to a hash generator block 78 that forms a hash of the signal. The hash may be formed using any suitable hash algorithm, for example the SHA-2 (Secure Hash Algorithm 2). The hash used for the MAC may be lossy.

The output of the liveness detection process performed by the spoof detection block 74, and the hash that is formed by the block 78 are then passed to an encryption block 80, where they are encrypted using a key.

The key may for example be a private key of the first device 70, generated via a standard key exchange algorithm, such as the Diffie-Hellman key exchange algorithm.

The spoof detection block 74 may also extract other information from the received signal, and this other information may also be encrypted with the output of the liveness detection process performed by the spoof detection block 74, and the hash that is formed by the block 78.

For example, the other information may include quality metrics relating to the received signal. The quality metrics may for example include the properties of the received audio signal mentioned above, such as SNR of the received audio signal and the fundamental frequency (FO) of the speech in the received audio signal. A low SNR of the received audio signal may be the result of high levels of background noise in the vicinity of the speaker, or may result from the speaker being a long way from the microphone of the device, for example.

In addition to the liveness detection described above, the spoof detection block 74 may also perform an initial biometric analysis of the received audio signal. For example, the spoof detection block 74 may extract some features from the received audio signal, and compare these with a model of the speech of one or more previously enrolled speaker. The result of the comparison may be expressed as a likelihood that the speech in the received audio signal is the speech of the enrolled speaker.

The result of the comparison may also be encrypted with the output of the liveness detection process performed by the spoof detection block 74, and the hash that is formed by the block 78.

Alternatively, or additionally, the extracted features of the received audio signal, that are suitable for use in a biometric analysis, may also be encrypted with the output of the liveness detection process performed by the spoof detection block 74, and the hash that is formed by the block 78.

Other information may also be encrypted with the output of the liveness detection process performed by the spoof detection block 74, and the hash that is formed by the block 78.

For example, in particular in a case such as that shown in FIG. 2, where the first device 70 is a completely separate device from the device to which the information is sent, this other information may include a device-specific identifier, such as the Ethernet media access control (MAC) address of the first device, or the Internet Protocol (IP) address of the device. Sending a device ID in this way allows the receiving device to verify that the speech is from the intended device.

The other information may also include information about a location of the device, for example obtained from a global navigation satellite system (GNSS), such as the Global Positioning System (GPS).

The other information may also include information for use in computational auditory scene analysis (CASA), for example.

As mentioned above, any additional information in any of these categories may also be encrypted by the encryption block 80, together with the output of the liveness detection process performed by the spoof detection block 74, and the hash that is formed by the block 78. In other embodiments, some of this additional information need not be encrypted, and may be sent unencrypted.

The encrypted output of the encryption block 80 therefore acts as a certificate, which can be used by a second device to verify that the output of the spoof detection block 74 has not been altered, and also serves to associate the output of the spoof detection block 74 with a specific section of the received signal that has been applied to the spoof detection block 74.

The output of the encryption block 80 is then passed to an interface block 82, where for example it might be put into a format that is suitable for transmission over a wired or wireless connection to a second device.

The relevant segment of the received audio signal that is associated with the output of the spoof detection block 74 is also passed, after any downsampling performed by the optional downsampling block 76, to the interface block 82 to be put into the format that is suitable for transmission to the second device.

The signal generated by the interface block 82 of the first device 70 is then transmitted to a second device. As described with reference to FIG. 1, this may involve transmitting the signal over a wired interface between the two devices. As described with reference to FIG. 2, this may involve transmitting the signal over a wireless interface between the two devices.

FIG. 5 is a block diagram, showing in more detail the features of the second device 90 that are relevant for the purposes of receiving the signal relating to the liveness detection.

The signal that is received by the second device 90 is received by an interface circuit 92, which is configured for extracting the data from the formatting used for transmission of the signal.

A first part of the data is expected to be the certificate that was generated by the encryption block 80 of the first device 70, and this certificate is sent to a decryption block 96, which performs a decryption operation that extracts the data that was encrypted by the encryption block 80 of the first device. The decryption operation uses a public key of the first device 70, corresponding to the private key used by the encryption block 80 of the first device 70.

As described above, with reference to FIG. 4, the data obtained by the decryption operation may include the output of the liveness detection process performed by the spoof detection block 74, and the hash that is formed by the hash generator block 78.

The data that is obtained by the decryption operation may also include some or all of the following additional information described with reference to FIG. 4, namely: quality metrics relating to the received audio signal, such as the SNR of the received audio signal and the fundamental frequency (FO) of the speech in the received audio signal; the result of the biometric analysis of the received audio signal, for example expressed as a likelihood that the speech in the received audio signal is the speech of a particular enrolled speaker; extracted features of the received audio signal, that are suitable for use in a biometric analysis; a device-specific identifier of the first device 70, such as the Ethernet MAC address of the first device, or the IP address of the device; information about a location of the device, for example GNSS or GPS data; and information for use in computational auditory scene analysis.

A second part of the data that is extracted from the received signal by the interface circuit 92 comprises the audio signal that was received by the first device 70, in the form in which it was transmitted. That is, in an embodiment as shown in FIG. 4, where the received audio signal is downsampled before transmission, it is the downsampled version that forms the second part of the data that is extracted by the interface circuit 92 from the signal received by the second device 90.

This second part of the data is passed to a hash generator block 98 that forms a hash of the data, using a hash generation function that is the same as that used by the hash generator block 78 in FIG. 4.

Since the hash generation functions used by the hash generator block 78 and the hash generator block 98 are the same, the hashes that they form should be the same, provided that the second part of the data that is extracted from the received signal by the interface circuit 92 is the same as the data that was transmitted by the first device 70, that is, provided that the data has not been tampered with.

Thus, the hash generated by the hash generator block 98, and the hash decrypted by the decryption block 96 from the first part of the data that is extracted from the received signal by the interface circuit 92, are both passed to a comparison block 100, which checks whether the hashes are in fact the same.

If so, a positive output is supplied on the output of the comparison block 100.

Thus, the output of the comparison block 100 allows the second device 90 to confirm that the data that it has received is the same as the data that was subjected to the liveness detection test performed by the first device.

In addition, because the result of the liveness detection test has been encrypted, the second device 90 can be assured that the result that it obtains by the decryption operation performed by the decryption block 96 is the correct result.

The second device can then act on that liveness detection result as required. For example, if the liveness detection result has a first output value, indicating that the received audio signal has a high probability of representing live speech, then the received audio signal can be applied to a speech processing block, and any command that is detected can be acted on.

However, if the liveness detection result has a second output value, indicating that the received audio signal has a low probability of representing live speech, then the second device 90 may decide not to apply the received audio signal to the speech processing block, or may decide not to act on any command that is detected by the speech processing block.

If the liveness detection result has a third output value, indicating that the liveness detection process is unable to assess with any confidence whether the received signal represents live speech, then the second device 90 may take suitable action. For example, the action taken may depend on the sensitivity of a command that is detected by the speech processing block. If mistakenly executing a particular command would involve a high cost, either financially or in any other way, then the second device may choose to act on that command only if the liveness detection result has the first output value, indicating that the received audio signal has a high probability of representing live speech. However, if mistakenly executing a particular command would involve a low cost, then the second device may choose to act on that command even if the liveness detection result has the third output value.

Similarly, the second device may act on any of the additional information mentioned above, that is obtained by the decryption operation. For example, even if the liveness detection result has the first output value, indicating that the received audio signal seems to have a high probability of representing live speech, the second device may choose to disregard the received audio signal if: the result of the biometric analysis of the received audio signal indicates that the speech in the received audio signal is not the speech of the expected speaker; the device-specific identifier of the first device 70 indicates that the device is not the one that was expected to send data to the second device; the information about the location of the device indicates that the device that has sent the data is not the one that was expected to send the data to the second device; or the CASA information indicates that the device that has sent the data is not the one that was expected to send the data to the second device.

Figure 6:
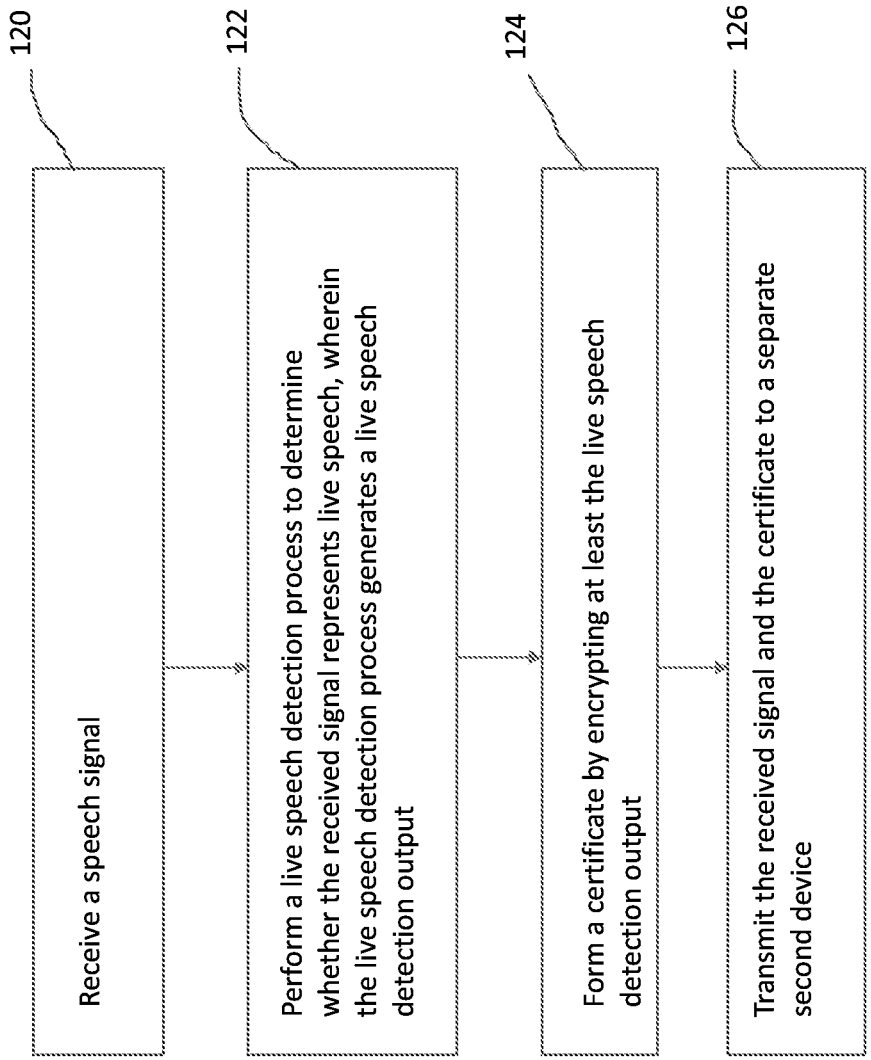
FIG. 6 is a flow chart, illustrating a method.

FIG. 6 is a flow chart, illustrating a method in accordance with certain embodiments.

The method begins at step 120, in which a speech signal is received in a first device.

In step 122, the first device performs a live speech detection process to determine whether the received signal represents live speech. The live speech detection process generates a live speech detection output.

The live speech detection process may generate the live speech detection output in the form of a score value having at least two possible values.

More specifically, the live speech detection process may have three possible live speech detection outputs, comprising: a first live speech detection output corresponding to a high probability that the received signal represents live speech; a second live speech detection output corresponding to a low probability that the received signal represents live speech; and a third live speech detection output corresponding to an uncertainty whether the received signal represents live speech.

For example, the live speech detection process may be configured to generate said third live speech detection output when a signal-noise ratio of the received signal is below a noise threshold. As another example, the live speech detection process may be configured to generate said third live speech detection output when a fundamental frequency of speech in the received signal is above a frequency threshold.

In step 124, a certificate is formed by encrypting at least the live speech detection output.

The method may comprise a step of forming a hash of the received signal, in which case step 124 may comprise forming the certificate by encrypting the hash of the received signal with the live speech detection output. The hash may be a lossy hash.

Step 124 may comprise forming the certificate by also encrypting a quality metric of the received signal with the live speech detection output. The quality metric of the received signal may for example comprise a signal-noise ratio of the received signal or a fundamental frequency of speech in the received signal.

In step 126, the first device transmits the received signal and the certificate to a separate second device.

The speech signal may be received with a first sample rate, and the live speech detection process may then be performed using the received speech signal with the first sample rate. The received signal may also be decimated to a second sample rate, and the received signal may be transmitted to the separate second device with the second sample rate. The first sample rate may be greater than 16 kHz while the second sample rate is 16 kHz.

The method may further comprise obtaining biometric information on the first device. The biometric information may comprise information about biometric features of a user of the first device. If biometric information is obtained, step 126 may comprise transmitting the biometric information to the separate second device. In addition, step 124 may comprise forming the certificate by encrypting the biometric information with the live speech detection output.

Step 126 may further comprise transmitting a device specific identifier to the separate second device. In that case, step 124 may comprise forming the certificate by encrypting the device specific identifier with the live speech detection output. The device specific identifier may for example comprise an ethernet Medium Access Control address of the device or an Internet Protocol address of the device.

Step 126 may further comprise transmitting information about a location of the first device to the separate second device. In that case, step 124 may comprise forming the certificate by encrypting the information about the location of the first device with the live speech detection output. The information about the location of the first device may for example be obtained from a GNSS receiver.

There are thus disclosed methods and devices that allow a live speech detection signal to be generated in a first device, and received securely in a second device.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method of authenticating a speech signal in a first device, the method comprising:
receiving a speech signal;
performing a live speech detection process to determine whether the received signal represents live speech, wherein the live speech detection process generates a live speech detection output;
forming a certificate by encrypting at least a quality metric of the received signal with the live speech detection output, wherein the quality metric of the received signal comprises a fundamental frequency of speech in the received signal; and
transmitting the received signal and the certificate to a separate second device.

2. The method according to claim 1, further comprising:
forming a hash of the received signal; and comprising:
forming the certificate by encrypting the hash of the received signal with the live speech detection output.

3. The method according to claim 1, comprising:
receiving the speech signal with a first sample rate;
performing the live speech detection process using the received speech signal with the first sample rate;
decimating the received signal to a second sample rate; and
transmitting the received signal to the separate second device with the second sample rate.

4. The method according to claim 3, wherein the first sample rate is higher than 16 kHz and the second sample rate is 16 kHz.

5. The method according to claim 1, wherein the live speech detection process generates the live speech detection output in the form of a score value having at least two possible values.

6. The method according to claim 1, wherein the quality metric of the received signal comprises a signal-noise ratio of the received signal.

7. The method according to claim 1, further comprising:
transmitting a device specific identifier to the separate second device.

8. The method according to claim 7, further comprising forming the certificate by encrypting said device specific identifier with the live speech detection output.

9. A device comprising:
an input for receiving a speech signal; and
a processor for performing a live speech detection process to determine whether the received signal represents live speech, wherein the live speech detection process generates a live speech detection output; and for forming a certificate by encrypting at least a quality metric of the received signal with the live speech detection output, wherein the quality metric of the received signal comprises a fundamental frequency of speech in the received signal; and
an output configured for transmitting the received signal and the certificate to a separate second device.

10. The device according to claim 9, wherein the output is configured for transmitting the received signal and the certificate to the separate second device, wherein the device and the separate second device are located in a single host device.

11. The device according to claim 9, wherein the device comprises a first integrated circuit, and the separate second device comprises a second integrated circuit located within the same host device as the first integrated circuit.

\* \* \* \* \*